United States Patent
Ganesan et al.

(10) Patent No.: US 11,949,786 B2
(45) Date of Patent: Apr. 2, 2024

(54) MACHINE LEARNING BASED CRYPTANALYSIS

(71) Applicant: Oracle International Corporation, Redwood Shores, CA (US)

(72) Inventors: Dharmalingam Ganesan, Crofton, MD (US); David M. Clifton, Ellicott City, MD (US)

(73) Assignee: Oracle International Corporation, Redwood Shores, CA (US)

( * ) Notice: Subject to any disclaimer, the term of this patent is extended or adjusted under 35 U.S.C. 154(b) by 306 days.

(21) Appl. No.: 17/448,551

(22) Filed: Sep. 23, 2021

(65) Prior Publication Data
US 2023/0091540 A1    Mar. 23, 2023

(51) Int. Cl.
*H04L 9/00*    (2022.01)
*G06N 20/00*    (2019.01)
*H04L 9/30*    (2006.01)

(52) U.S. Cl.
CPC ............... *H04L 9/30* (2013.01); *G06N 20/00* (2019.01)

(58) Field of Classification Search
CPC .......... H04L 9/30; H04L 9/006; H04L 9/004; G06N 20/00
See application file for complete search history.

(56) References Cited

U.S. PATENT DOCUMENTS

| | | | | |
|---|---|---|---|---|
| 11,055,448 | B2* | 7/2021 | Neuhäußer | G06Q 10/06 |
| 2009/0292941 | A1 | 11/2009 | Ganai et al. | |
| 2015/0082370 | A1* | 3/2015 | Jayaraman | H04L 63/20 726/1 |
| 2021/0264274 | A1* | 8/2021 | Kellerman | G06N 3/084 |

OTHER PUBLICATIONS

Program Synthesis Using Dual Interpretation, by Tiwari et al.; published 2015. (Year: 2015).*
International Search Report & Written Opirion dated Jan. 12, 2023 in PCT/US2022/076768.
Saha S. et al, "Automatics Characterization of Exploitable Faults: A Machine Learning Approach", IEEE Transactions on Information Forensics and Security, IEEE, USA, vol. 14, No. 4, Apr. 1, 2019, pp. 954-968, XP011693696.
Alexi et al., "RSA and Rabin Functions: Certain Parts are as Hard as the Whole," SIAM J. Comput., 1988, vol. 17(2), pp. 194-209, Society for Industrial and Applied Mathematics, Philadelphia, Pennsylvania.

(Continued)

*Primary Examiner* — Vu V Tran
(74) *Attorney, Agent, or Firm* — Potomac Law Group, PLLC (57) ABSTRACT

Embodiments decrypt or partially decrypt an encoded message or a private key, the encoded message or private key encoded by a public-key cryptography algorithm. Embodiments encode the public-key cryptography algorithm using a language of a program synthesizer and construct a grammar for the program synthesizer. Embodiments train the program synthesizer with training data comprising input-output pairs and execute the trained program synthesizer to generate a mathematical formula. Embodiments validate the generated mathematical formula and then perform the decrypting using the trained and validated program synthesizer.

20 Claims, 3 Drawing Sheets

(56) References Cited

OTHER PUBLICATIONS

Alexi et al., "RSA/Rabin Functions: Certain Parts are as Hard as the Whole," Oded Goldreich, 2003, retrieved from: https://www.wisdom.weizmann.ac.il/~oded/annot/node17.html, retrieved on Jul. 9, 2021, pp. 1.
Alur et al., "Search-based Program Synthesis," Communication of the ACM, 2018, vol. 61(12), pp. 84-93, Association for Computing Machinery, New York, New York.
Barrett et al., "About CVC4," Lecture Notes in Computer Science, 2011, retrieved from: https://cvc4.github.io/, retrieved on Jul. 9, 2021, pp. 1-3, Springer, Berlin/Heidelberg, Germany.
Barrett et al., "The SMT-LIB Standard—Version 2.6," The SMT-LIB Initiative, 2017, pp. 1-104.
Ghalaty et al., "Analyzing and Eliminating the Causes of Fault Sensitivity Analysis," Proceedings of the 2014 Design, Automation & Test in Europe Conference & Exhibition, 2014, Dresden, Germany, pp. 1-6.
Malozemoff et al., "Automated Analysis and Synthesis of Block-Cipher Modes of Operation", 2014 IEEE 27th Computer Security Foundations Symposium.
Mason et al., "A Natural Language Approach to Automated Cryptanalysis of Two-time Pads", CC''06, Oct. 30-Nov. 3, 2006, Alexandria, Virginia.
Unknown, "SyGus—Syntax-Guided Synthesis," https://sygus.org/, 2021, pp. 1-2.

\* cited by examiner

MACHINE LEARNING BASED CRYPTANALYSIS

FIELD

One embodiment is directed generally to cryptanalysis, and in particular to the use of machine learning based cryptanalysis.

BACKGROUND INFORMATION

Cryptanalysis is the study of analyzing information systems in order to study the hidden aspects of the systems. Cryptanalysis is used to breach cryptographic security systems and gain access to the contents of encrypted messages, even if the cryptographic key is unknown.

Traditionally, cryptanalysis of public-key cryptography algorithms is often conducted manually by researchers who have esoteric skills in mathematics and computer science. Cryptanalysts review the mathematical structure of cryptography algorithms in order to identify weaknesses in the design. Cryptanalysts manually construct a mathematical formula that helps expose private data (e.g., key, message) from public data parameters that are part of the cryptosystem, thereby decrypting encoded messages.

SUMMARY

Embodiments decrypt or partially decrypt an encoded message or a private key, the encoded message or private key encoded by a public-key cryptography algorithm. Embodiments encode the public-key cryptography algorithm using a language of a program synthesizer and construct a grammar for the program synthesizer. Embodiments train the program synthesizer with training data comprising input-output pairs and execute the trained program synthesizer to generate a mathematical formula. Embodiments validate the generated mathematical formula and then perform the decrypting using the trained and validated program synthesizer.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

One embodiment trains a program synthesizer with input output pairs of encrypted communication and uses the trained program synthesizer to further decrypt the encrypted communication in order to decrypt or partially decrypt an encoded message or a private key.

Embodiments implement a computer-aided cryptanalysis process for public-key cryptography algorithms such as RSA, Rabin, Diffie-Hellman key exchange, etc. Embodiments integrate automated program synthesis with public-key cryptography in order to perform cryptanalysis. Embodiments convert the public-key cryptanalysis problem into a program synthesis problem in order to automate cryptanalysis tasks.

In general, automated program synthesis generates a program that matches a high-level formal specification. The specification can range from a complete, formal behavioral specification to input-output examples (as in test cases) or a combination of a partial specification and input-output examples. Embodiments use a syntax-guided program synthesis ("SyGuS") approach by guiding the search space of possible programs to infer using a given grammar which is made of basic components (e.g., modular addition, exponentiation, etc.) that are the typical elements of public-key cryptography algorithms.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
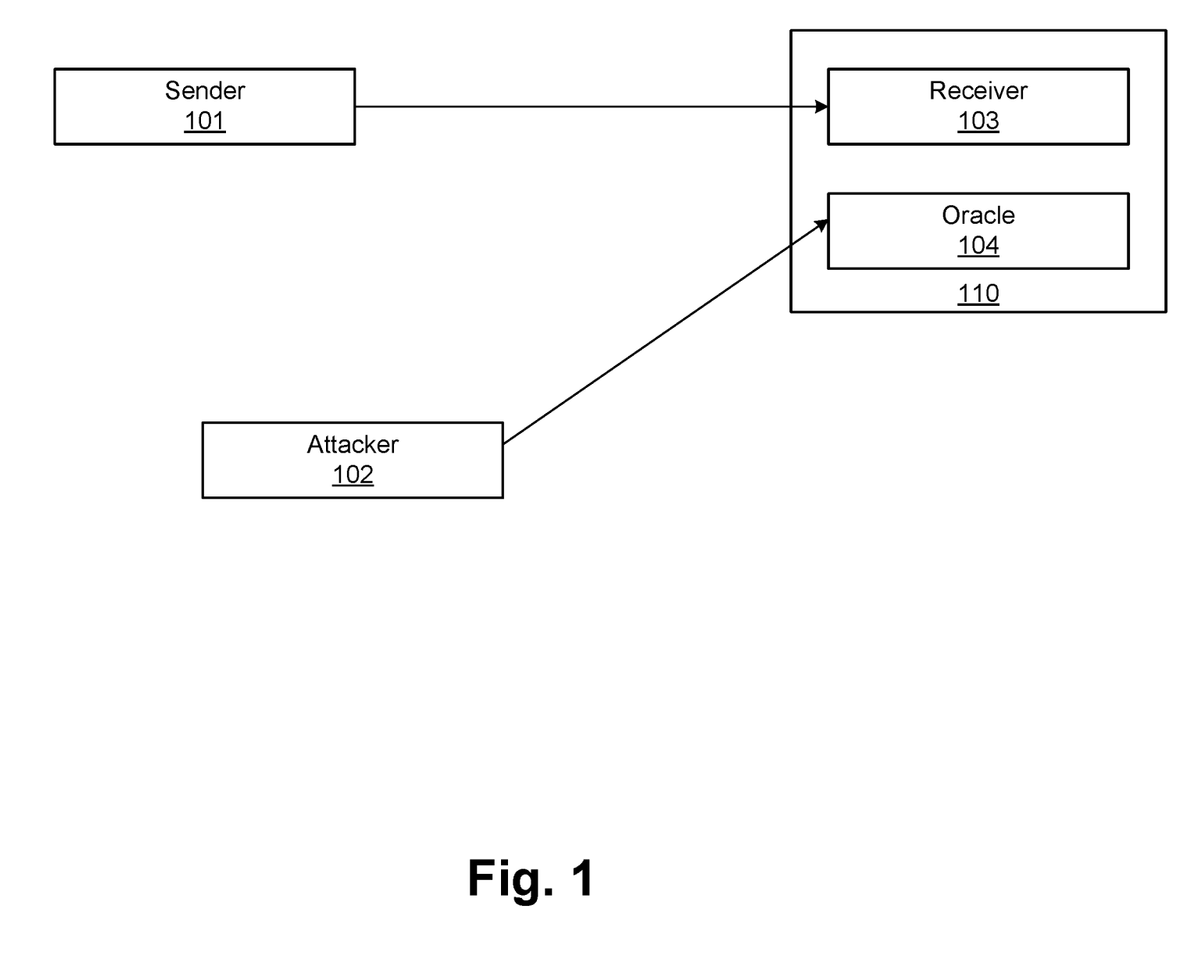
FIG. 1 illustrates a general encryption algorithm in accordance with embodiments.

FIG. 1 illustrates a general encryption algorithm 110 in accordance with embodiments. Encryption algorithm 110 includes a receiver 103 that receives messages from a sender 101 to encrypt. Encryption algorithm 110 further includes an "oracle" 104 that receives messages from an attacker 102.

In general with public-key cryptography, some encryption algorithms include hardcore bits of a secret message, or "oracle", meaning if cryptanalysts have access to an algorithm that predicts those hardcore bits, then they can recover an entire encrypted message by repeatedly applying the very same algorithm on different inputs. The concept of an "oracle attack" is by choosing the plaintext or ciphertext input to an encryptor or a decryptor, respectively, and analyzing the output as it relates to the chosen input, it is often possible to deduce valuable information about the algorithm or a secret item of information, such as one of the keys, that is being used in the algorithm.

Such a vulnerability in a cryptosystem is termed an "oracle" because, like a visit to the ancient Greek Oracle at Delphi, every input, or question, receives an output, or answer, and it is left up to the observer to decide if the answer is meaningful. When the output of an oracle in response to many inputs reveals a hidden truth, the cryptographic oracle attack has succeeded. Cryptographic constructions and/or implementations often have such an oracle in connection with timing information, message padding issues, error-handling, or other information leakage. Specifically, oracle 104 can answer a specific question, such as "What is the least-significant bit of an encrypted message." However, in general, it is a difficult cryptanalysis task to develop an algorithm that wisely uses an oracle 104 to decrypt the entire message.

In contrast, embodiments apply program synthesis for cryptanalysis tasks. Embodiments synthesize an algorithm that uses oracle 104 in a systematic way to decrypt the entire secret.

Figure 2:
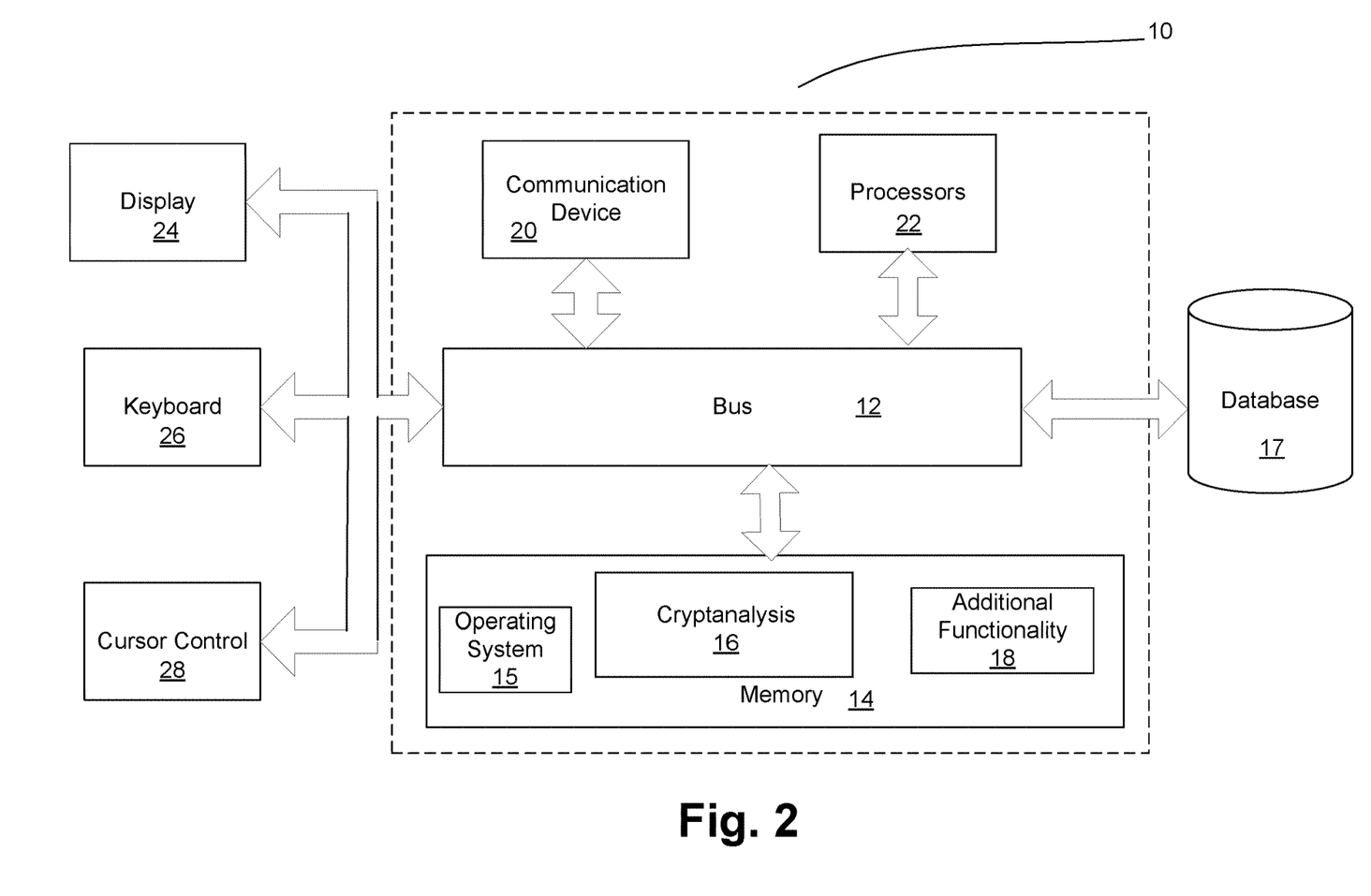
FIG. 2 is a block diagram of a computer server/system in accordance with an embodiment of the present invention that can be used to implement any of the functionality disclosed herein.

FIG. 2 is a block diagram of a computer server/system 10 in accordance with an embodiment of the present invention that can be used to implement any of the functionality disclosed herein. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include cryptanalysis module 16 that performs cryptanalysis in order to decrypt or partially decrypt an encoded message or a private key, and all other functionality disclosed herein. System 10 can be part of a larger system. Therefore, system 10 can include one or more additional functional modules 18 to include the additional functionality that can utilize encryption/decryption functionality. A file storage device or database 17 is coupled to bus 12 to provide centralized storage for modules 16 and 18, including decrypted keys, constraints and program synthesis grammar. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

As disclosed, embodiments use machine learning to construct a mathematical formula based on public data associated with cryptographic algorithms. For example, in the case of the Diffie-Hellman algorithm, embodiments use a machine learner, in the form of a program synthesizer, to uncover the least-significant bit ("LSB") of the private key from the corresponding public key. Similarly, an embodiment uses a machine learner to construct a mathematical expression that reveals parts of private keys when given access to an LSB oracle of the RSA algorithm.

In general, embodiments train the machine learning algorithm with input-output pairs and let the machine learner (i.e., program synthesizer) automatically perform cryptanalysis in order to decrypt or partially decrypt an encoded message or a private key.

Figure 3:
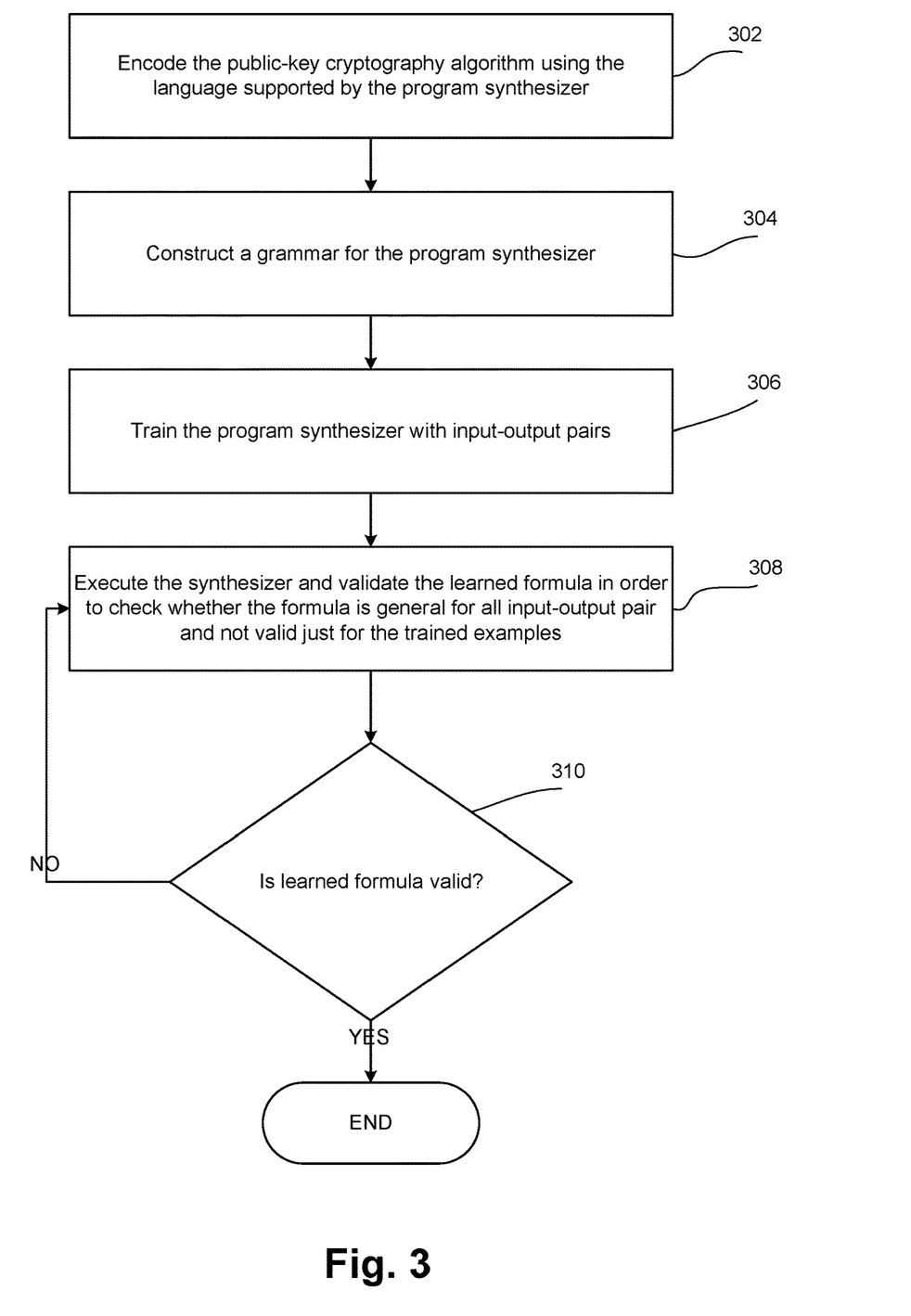
FIG. 3 is a flow diagram of the functionality of the cryptanalysis module of FIG. 2 for performing cryptanalysis in accordance with one embodiment.

FIG. 3 is a flow diagram of the functionality of cryptanalysis module 16 of FIG. 2 for performing cryptanalysis in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, embodiments encode the public-key cryptography algorithm using the language supported by the program synthesizer. One embodiment uses syntax-guided program synthesis, but other encoding techniques can be used, such as enumerative search, constraint solving, stochastic search, and deduction-based programming by examples. Embodiments that use syntax-guided synthesis allow the cryptanalyst to define the grammar which constraints the search space.

At 304, embodiments construct a grammar for the program synthesizer. The components of the grammar are primitives such as modular addition, multiplication, inverse, and any oracle, if available. In general, these primitives are often used in a public key cryptography context. The grammar can be evolved iteratively by adding more primitives if necessary.

At 306, embodiments train the program synthesizer with input-output pairs (i.e., training data). For example, if the goal is to construct a mathematical formula that will predict the second least significant bit ("LSB") LSB using the first LSB, embodiments train the synthesizer with a set of examples. For example, in the DH protocol example disclosed below, the training data refers to pairs made of the public key and the LSB of a private key. This is the training set.

At 308, embodiments execute the synthesizer to generate a mathematical formula and validate the learned mathematical formula in order to check whether the formula is general for all input-output pair and not valid just for the trained examples. In order to validate the learned formula, traditional proof techniques or theorem-provers can be used. In embodiments, program synthesis is used to validate the learned formula by changing the parameter values of the underlying cryptographic algorithm. If a formula is learned for a particular training set, embodiments change the training set in order to validate whether the formula is generalizable, therefore retraining the machine learning model based on output. For example, in the DH protocol, embodiments can change the group generator and validate whether the learned formula is valid or not. Axioms of mathematics may be used to prove whether the machine-learned formula is correct for all possible scenarios.

At 310, if the learned formula is not valid at 308, embodiments extend the trained input-output pairs with data (i.e., the input-output pairs) from 308 and functionality resumes at 308 so that the program synthesizer is retrained. Otherwise, the cryptanalysis is complete.

As a result of the functionality of FIG. 3, embodiments can either decrypt an entire message (or keys) or learn partial information about them (i.e., partial decryption) using the trained and validated program synthesizer. As described below, in the DH example, embodiments learn partial information about private keys, while in the RSA example embodiments learn the entire message using an oracle which leaks only the LSB of the encrypted message. The generated mathematical formula takes only the public data (e.g., public key, ciphertext) and returns private information. Because, in general, the public and private data are mathematically related, embodiments utilize machine learning to learn the latent relation.

Automated Program Synthesis Example

Embodiments use program synthesis in order to automate cryptanalysis. One embodiment implements CVC4 as a program synthesizer. CVC4 is an efficient open-source automatic theorem prover for satisfiability modulo theories ("SMT") problems. It can be used to prove the validity (or, dually, the satisfiability) of first-order formulas in a large number of built-in logical theories and their combination. In other embodiments, alternative program synthesizers can be used.

In an example of automatic program synthesis, assume a requirement is to synthesis a program that finds the second maximum among three distinct numbers. In embodiments, the SMT language syntax is used to specify the functions and types because the program synthesizer language is also in SMT. The syntax is explained below.

The bool2Int function converts a Boolean value b into an int: If b is true, it returns 1; otherwise, 0. "it" stands for if-then-else in SMT:

```
(define-fun bool2Int ((b Bool)) Int
    (ite (= b true) 1 0)
)
```

The max and min functions returns the maximum and minimum of two numbers x and y, respectively:
(define-fun max ((x Int) (y Int)) Int (−x (*(−x y) (bool2Int (<x y)))))
(define-fun min ((x Int) (y Int)) Int (−x (*(−x y) (bool2Int (<y x)))))

In order to synthesize using SyGus, a grammar needs to be specified which contains the allowed list of variables (e.g., x, y, z) and components (e.g., max, min):

```
(synth-fun second_max (( x Int) (y Int) (z Int)) Int
    ((Start Int (
        x y z
        (max Start Start)
        (min Start Start)
    ))
    )
)
```

The specification is given using a set of input-output pairs. For example, the statement (constraint (=(second_max 1 2 3) 2)) means that the second_max function should return 2 when it is invoked with arguments (1, 2, 3). The second_max code is synthesized using the components (e.g., max, min) mentioned in the grammar. The synthesized function (in this example) is not optimal in terms of the number of comparisons but it does illustrate how algorithms can be synthesized from components.
(constraint (=(second_max 1 2 3) 2))
(constraint (=(second_max 3 2 1) 2))
(constraint (=(second_max 1 3 2) 2))
(constraint (=(second_max 3 1 2) 2))
(constraint (=(second_max 2 31) 2))
(constraint (=(second_max 2 1 3) 2))

The check-synth command is for asking the SyGus synthesizer tool to synthesize a function that satisfies the constraints discussed above:
(check-synth)

After running the following SyGus command using the CVC4 utility, the synthesized code is printed by it.
./cvc4-2020-05-29-x86_64-linux-opt--lang=sygus1 max_second.sygus
(define-fun second_max ((x Int) (y Int) (z Int)) Int (min (max x y) (max z (min x y))))

As shown, syntax-guided program synthesis attempts to derive a program using the components mentioned in the given grammar to match the given specification.

RSA Cryptanalysis using Program Synthesis Example

Rivest—Shamir—Adleman ("RSA") is a public-key cryptosystem that is widely used for secure data transmission. In RSA, the sender encrypts a message using the receiver's public key. Only the receiver can decrypt the message using the corresponding private key.

In RSA, the key generation phase is as follows: Let b represent the key size in bits. Two random, private prime numbers p and q are generated to form the public key n by multiplying p and q. Therefore, n=pq. Note that both p and q are secret primes, and each is roughly of size b/2 bits. e and d are then selected such that e*d=1 (mod phi(n)) where phi(n)=(p−1)(q−1).

In practice, the public e is a fixed constant. If no matching private d can be selected, then new primes p and q are selected until a suitable d is found. The public key is <n, e> and the private key is <n, e, d, p, q>. RSA is believed to be hard to break because it is difficult to efficiently find (1) p and q from n, or (2) phi(n) from n.

In RSA, the encryption function is as follows: Let x be a message which is also called a plaintext. In RSA, the message must be encoded as an integer in [0, n). The sender encrypts the message x by using the public key <n, e> of the receiver and calling the encrypt function enc defined below.

$$enc(x)=x^e(\text{mod } n)=y$$

y is the ciphertext corresponding to the plaintext x. Since the encryption function enc is a deterministic function, randomness is added to the plaintext before enc is applied to avoid attacks. It is widely believed that given y it is difficult to find x, because there is no known efficient algorithm that can commute the e-th root in a composite modulo arithmetic context.

In RSA, the decryption function is as follows: The receiver will decrypt the incoming ciphertext y using its private key exponent d and recover the plaintext x:

$$dec(y)=y^d(\text{mod } n)=x$$

The last equality is due to number theory results of Euler and Fermat.

Embodiments then apply the program synthesizer on RSA as follows: Assume there is an oracle IsbOra(y, e, n) which takes the ciphertext y, and public key <n, e> and returns the least significant bit (LSB) of the plaintext x. Embodiments use program synthesis to automatically use this IsbOra and decrypt the entire message, bit by bit.

Embodiments utilize the program synthesizer to leverage a grammar which enumerates the allowed list of primitives that can be invoked to learn a formula that matches the input-output pair (i.e., the training data set). The list of primitives consists of fundamental mathematical functions used in public key cryptography. For example, functions such as mod, power, inverse, etc., are often part of the catalog that the synthesizer is allowed to use. If there is an oracle function, then embodiments also include that as part of the allowed list of primitives. This capability is leveraged for the cryptanalysis of RSA.

The RSA encryption "enc" and decryption functions "dec" are formalized below (corresponding to 302 of FIG. 3 when encoding the encryption and decryption functions in the SMT language). "pow" is the exponent function:

```
(define-fun enc ((x Int) (e Int) (n Int)) Int
    (mod (pow (mod x n) e) n)
)
(define-fun dec ((y Int) (d Int) (n Int)) Int
    (mod (pow (mod y n) d) n)
)
```

Embodiments then specify the oracle using the SMT language (corresponding to 302 and partly to 304 of FIG. 3 because the oracle is part of the grammar). The least significant bit oracle IsbOra is given below. Note that the oracle knows the private key (3 in the example below). However, the synthesizer is using the IsbOra as a black-box only. In other words, the synthesizer is not given the private key value. The IsbOra is allowed to call the RSA decryption function:

```
(define-fun IsbOra ((y Int) (n Int)) Int
    (lsb (dec (mod y n) 3 n))
)
```

Embodiments then specify the grammar (corresponding 304 of FIG. 3). The grammar is given as below:

```
(synth-fun half_pred ((y Int) (e Int) (n Int)) Int
    ((Start Int (
        y e n
        1 2
        (modAdd Start Start n)
        (modMul Start Start n)
        (IsbOra Start n)
        (enc Start Start n)
    ))
    )
)
```

This grammar is allowing the program synthesizer to use the commonly occurring modulo operations as well as the oracle (IsbOra) and the encryption function. The synthesizer is also trained with a set of examples that specify the behavior that should be synthesized (corresponding 306 of FIG. 3).

In an example, RSA is applied on a small composite number n=15. Thus, p=5, q=3, phi(n)=8. Further, e=3 and d=3 because e*d=1 (mod phi(n)).

The RSA encryption table is given below; for all possible plaintexts x, the corresponding ciphertext is computed.

| x | 0 | 1 | 2 | 3 | 4 | 5 | 6 | 7 | 8 | 9 | 10 | 11 | 12 | 13 | 14 |
|---|---|---|---|---|---|---|---|---|---|---|----|----|----|----|----|
| Y | 0 | 1 | 8 | 12 | 4 | 5 | 6 | 13 | 2 | 9 | 10 | 11 | 3 | 7 | 14 |

The following examples specify the input-output pairs for the ring of integers $Z_{15}$.

Embodiments then interpret an input-output specification (constraint (=(half_pred 1 3 15) 0)). half_pred means predicting whether the unknown plaintext x is <n/2 or not. Cryptanalysts do not know the plaintext x but knows the corresponding ciphertext y because it is sent in clear and thus y is public. In (half_pred 1 3 15), y is 1, e is 3, n is 15. In (constraint (=(half_pred 1 3 15) 0)) means that the value of x is <n/2, denoted by 0. On the other hand, (constraint (=(half_pred 9 3 15) 1)) means that the value of x is >n/2, denoted by 1. Cryptanalysts can easily construct such a specification using examples.

(constraint (=(half_pred 1 3 15) 0))
(constraint (=(half_pred 8 3 15) 0))
(constraint (=(half_pred 12 315) 0))
(constraint (=(half_pred 4 3 15) 0))
(constraint (=(half_pred 5 315) 0))
(constraint (=(half_pred 6 3 15) 0))
(constraint (=(half_pred 13 3 15) 0))
(constraint (=(half_pred 2 315) 1))
(constraint (=(half_pred 9 3 15) 1))
(constraint (=(half_pred 10 3 15) 1))
(constraint (=(half_pred 11 3 15) 1))
(constraint (=(half_pred 3 3 15) 1))
(constraint (=(half_pred 7 315) 1))
(constraint (=(half_pred 14 3 15) 1))

Embodiments then, by running the following command, let the synthesizer generate/propose an attack algorithm (corresponding to 308 of FIG. 3). As shown below, in the example the synthesizer used the input-output examples as well as the grammar to infer the attack algorithm automatically. This illustrates the use of program synthesis for cryptanalysis of public-key cryptography.

$ ./cvc4-2020-05-29-x86_64-linux-opt--lang=sygus1 rsa_half.sygus
(define-fun half_pred ((y Int) (e Int) (n Int)) Int (IsbOra (modMul y (enc 2 e n) n) n))

The synthesized function takes as input the ciphertext y and public parameters e and n, and inferred an algorithm that can predict the most significant bit of the secret message. The program synthesizer successfully inferred a function by using the LSB oracle IsbOra, modulo multiplication modMul, and the public encryption function enc.

The above example shows that the synthesized function predicts the most significant bit from this LSB oracle, for all possible e and n; not just for the trained example configuration. By repeatedly applying half_pred, the cryptanalysts can easily learn all the bits of the secret message x.

DH Cryptanalysis using Program Synthesis Example

The above example using RSA cryptanalysis leveraged an oracle. However, embodiments are also applicable to cryptanalysis even if it is assumed that there is no such oracle. Specifically, there may be mathematical weaknesses in the algorithm that could be exposed using program synthesis. For example, using a general-purpose program synthesis algorithm, embodiments can predict the LSB of a private key from the public key in the basic version of the Diffie-Hellman ("DH") key exchange algorithm. Using the specification of the DH key exchange algorithm and examples of input-output pairs, in embodiments the program synthesizer can generate an algorithm that successfully and automatically predicts the LSB of a private key.

Referring to DH, in order for two parties to communicate securely, they both have to agree on a common key k that can be used for encryption and decryption. The DH key exchange algorithm solved this fundamental key agreement problem in that both parties can arrive at a common key k using a public channel, without any previous arrangements (e.g., courier service).

The DH algorithm is defined using a one-way function, formalized below. Specifically:
Let p be a prime number, and let $Z^*_p = \{1, 2, 3, \ldots, p-1\}$. One of the fundamental results in number theory is that $Z^*_p$ contains a special element called generator g. For example, let p=11; $Z^*p = \{1, 2, 3, 4, 5, 6, 7, 8, 9, 10\}$. In $Z^*11$, 2 is a generator because all elements of $Z^*11$ can be represented as $2^i$ in mod p, for some integer i.
$Z^*p$ is a cyclic group because $Z^*p$ contains a generator. The DH key exchange algorithm is defined in a cyclic group such as $Z^*p$.

An example of the DH key exchange algorithm is as follows: Let Alice and Bob are two parties who want to agree on a common key k. "Alice" and "Bob" can be considered two computer applications that are connected by a computer network. The goal of the DH is to establish a shared secret key which can be used by them to encrypt and decrypt messages. Both of them have to publicly agree on p and g. In embodiments, p and g can be defined by the U.S. National Institute of Standards and Technology ("NIST") or by other sources. The following steps explain the DH key exchange algorithm:
  Step 1: Alice randomly picks an integer, private key x in (1, p). Similarly, Bob randomly picks a private key y in (1, p);
  Step 2: Alice sends $A=g^x$ (mod p) to Bob;
  Step 3: Bob sends $B=g^y$ (mod p) to Alice;
  Step 4: Alice computes $B^x$ and Bob computes $A^y$. Because $B^x = A^y = g^{xy}$, they both have the same key $k = g^{xy}$ The DH key exchange algorithm's security is based on the assumption that (1) given public values $g^x$, $g^y$, it is difficult to find $g^{xy}$; or (2) given the public values $g^x$ (or $g^y$), it is difficult to find x (or y); this problem is called the discrete log problem.

Embodiments perform cryptanalysis of the DH function using program synthesis as follows: Let g be a generator and the function dh: $Z^*_p \to Z^*_p$ be defined as $dh(x) = g^x \pmod{p} = h$ This function dh is widely believed to be one-way, meaning given dh(x) it is computationally difficult to find x. However, this definition does not mean that partial information about the input x cannot be inferred from dh(x).
To that end, embodiments will apply program synthesis to demonstrate how to derive partial information about the secret x from dh(x). For example, the below example shows here how program synthesis can infer the least-significant bit ("LSB") of the secret input x from dh(x).

Embodiments formalize the DH function described above using the SMT language syntax.

```
(define-fun dh ((g Int) (x Int) (p Int)) Int
    (mod (pow g (mod x (- p 1))) p)
)
```

Embodiments then construct the grammar as follows:

```
(synth-fun Isb_pred ((g Int) (p Int) (h Int)) Int
    ((Start Int (
        g p h
        (Constant Start)
        (div Start Start)
        (dh Start Start p)
    ))
    )
)
```

The above grammar includes components such as integer division (div) operator, the dh function, and is allowed to use constant integers.

Embodiments then train the program synthesizer with input-output pairs. Input-Output examples are defined in $Z^*p$, where p=11 and g=2 are a generator for $Z^*p$.
(declare–const p Int)
(assert (=p 11))
(declare–const g Int)
(assert (=g 2))

Embodiments declare the following constraints using the dh(x) for all integer x in [1 10]

| x     | 1 | 2 | 3 | 4 | 5  | 6 | 7 | 8 | 9 | 10 |
|-------|---|---|---|---|----|---|---|---|---|----|
| dh(x) | 2 | 4 | 8 | 5 | 10 | 9 | 7 | 3 | 6 | 1  |

(constraint (=(Isb_pred g p 2) (Isb 1)))
(constraint (=(Isb_pred g p 4) (Isb 2)))
(constraint (=(Isb_pred g p 8) (Isb 3)))
(constraint (=(Isb_pred g p 5) (Isb 4)))
(constraint (=(Isb_pred g p 10)(Isb 5)))
(constraint (=(Isb_pred g p 9) (Isb 6)))
(constraint (=(Isb_pred g p 7) (Isb 7)))
(constraint (=(Isb_pred g p 3) (Isb 8)))
(constraint (=(Isb_pred g p 6) (Isb 9)))
(constraint (=(Isb_pred g p 1) (Isb 10)))
The synthesizer using the cvc4 tool is run as follows:
$cvc4-2020-05-29-x86_64-linux-opt--lang=sygus1 dh_Isb.sygus
Resulting in the following output:
(define-fun Isb_pred ((g Int) (p Int) (h Int)) Int (dh p (dh h (div p 2) p) p))

Let $h=g^x$. Then Isb_pred(g, p, h) shown above is able to predict the least-significant bit (LSB) of x. This example shows that program synthesis is capable of analyzing the DH key exchange algorithm's one-way function and capable of automatically perform cryptanalysis tasks. Note that the inferred function Isb_pred is true not just for the trained examples but also for all possible p and g.

Embodiments can further be used to assess how hard it is to break a cryptosystem given an oracle. For example, in contrast to RSA, it is believed that the LSB oracle of the DH algorithm cannot be used to efficiently recover all other bits of a private key. By letting a program synthesizer explore the space of different possible ways to query the LSB oracle, cryptanalysts can gain new insights such as whether an oracle is a high-risk one or there is no trivial way to apply the oracle.

As disclosed, embodiments are directed to a computer-aided process for cryptanalysis of public-key cryptography algorithms such as RSA. Embodiments automatically analyze such algorithms and generates attacks automatically.

As disclosed, in public-key cryptography, generally there are hardcore bits of a secret message, meaning if cryptanalysts have access to an algorithm that predicts those hardcore bits they can recover the entire message by repeatedly applying the very same algorithm on different inputs. As an example, if there is an oracle that can answer a specific question: What is the least-significant bit (LSB) of an encrypted message. In general, it is a non-trivial cryptanalysis task to come up an algorithm that wisely uses such an oracle to decrypt the entire message. To that end, embodiments apply program synthesis for cryptanalysis tasks. Embodiments synthesize an algorithm that uses the oracle in a systematic way to decrypt the entire secret.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of decrypting or partially decrypting an encoded message or a private key, the encoded message or private key encoded by a public-key cryptography algorithm, the method comprising:

encoding the public-key cryptography algorithm using a language of a program synthesizer;
constructing a grammar for the program synthesizer;
training the program synthesizer with training data comprising input-output pairs;
executing the trained program synthesizer to generate a synthesized mathematical formula;
validating the generated synthesized mathematical formula; and
performing the decrypting using the validated synthesized mathematical formula.

2. The method of claim 1, further comprising:
when the generated synthesized mathematical formula is not validated, repeating the executing the trained program synthesizer to generate the synthesized mathematical formula.

3. The method of claim 1, wherein the program synthesizer comprises a satisfiability modulo theories (SMT) solver.

4. The method of claim 1, wherein encoding the public-key cryptography algorithm comprises uses syntax-guided program synthesis.

5. The method of claim 1, wherein the public-key cryptography algorithm comprises an oracle, and the encoding the public-key cryptography algorithm specifies the oracle.

6. The method of claim 1, wherein the public-key cryptography algorithm comprises an Rivest-Shamir-Adleman (RSA) algorithm comprising a least-significant bit oracle, further comprising using the synthesized mathematical formula and the oracle to decrypt an entire RSA encrypted message.

7. The method of claim 1, wherein the public-key cryptography algorithm comprises an Diffie-Hellman (DH) algorithm, further comprising using the synthesized mathematical formula to determine a least-significant bit of a private key from a DH public key.

8. A non-transitory computer readable medium having instructions stored thereon that, when executed by one or more hardware processors, cause the hardware processors to decrypt or partially decrypt an encoded message or a private key, the encoded message or private key encoded by a public-key cryptography algorithm, the decryption comprising:

encoding the public-key cryptography algorithm using a language of a program synthesizer;
constructing a grammar for the program synthesizer;
training the program synthesizer with training data comprising input-output pairs;
executing the trained program synthesizer to generate a synthesized mathematical formula;
validating the generated synthesized mathematical formula; and
performing the decrypting using the validated synthesized mathematical formula.

9. The computer readable medium of claim 8, the decryption further comprising:
when the generated synthesized mathematical formula is not validated, repeating the executing the trained program synthesizer to generate the synthesized mathematical formula.

10. The computer readable medium of claim 8, wherein the program synthesizer comprises a satisfiability modulo theories (SMT) solver.

11. The computer readable medium of claim 8, wherein encoding the public-key cryptography algorithm comprises uses syntax-guided program synthesis.

12. The computer readable medium of claim 8, wherein the public-key cryptography algorithm comprises an oracle, and the encoding the public-key cryptography algorithm specifies the oracle.

13. The computer readable medium of claim 8, wherein the public-key cryptography algorithm comprises an Rivest-Shamir-Adleman (RSA) algorithm comprising a least-significant bit oracle, further comprising using the synthesized mathematical formula and the oracle to decrypt an entire RSA encrypted message.

14. The computer readable medium of claim 8, wherein the public-key cryptography algorithm comprises an Diffie-Hellman (DH) algorithm, further comprising using the synthesized mathematical formula to determine a least-significant bit of a private key from a DH public key.

15. A decryption system comprising:
one or more hardware processors adapted to:
receive an encoded message or a private key, the encoded message or private key encoded by a public-key cryptography algorithm;
encode the public-key cryptography algorithm using a language of a program synthesizer;
construct a grammar for the program synthesizer;
train the program synthesizer with training data comprising input-output pairs;
execute the trained program synthesizer to generate a synthesized mathematical formula;
validate the generated synthesized mathematical formula; and
performing the decrypting using the validated synthesized mathematical formula.

16. The decryption system of claim 15, further comprising:
when the generated synthesized mathematical formula is not validated, repeating the executing the trained program synthesizer to generate the synthesized mathematical formula.

17. The decryption system of claim 15, wherein the program synthesizer comprises a satisfiability modulo theories (SMT) solver.

18. The decryption system of claim 15, wherein encoding the public-key cryptography algorithm comprises uses syntax-guided program synthesis.

19. The decryption system of claim 15, wherein the public-key cryptography algorithm comprises an Rivest-Shamir-Adleman (RSA) algorithm comprising a least-significant bit oracle, further comprising using the synthesized mathematical formula and the oracle to decrypt an entire RSA encrypted message.

20. The decryption system of claim 15, wherein the public-key cryptography algorithm comprises an Diffie-Hellman (DH) algorithm, further comprising using the synthesized mathematical formula to determine a least-significant bit of a private key from a DH public key.

* * * * *

UNITED STATES PATENT AND TRADEMARK OFFICE
CERTIFICATE OF CORRECTION

PATENT NO. : 11,949,786 B2
APPLICATION NO. : 17/448551
DATED : April 2, 2024
INVENTOR(S) : Ganesan et al.

It is certified that error appears in the above-identified patent and that said Letters Patent is hereby corrected as shown below:

On the Title Page

Column 2, item (56) under Other Publications, Line 3, delete "Opirion" and insert -- Opinion --, therefor.

In the Specification

In Column 9, Line 41, delete "2'" and insert -- $2^i$ --, therefor.

In Column 9, Line 60, delete "B=gf" and insert -- $B=g^y$ --, therefor.

In Column 10, Line 3, delete "h" and insert -- h. --, therefor.

Signed and Sealed this
Sixth Day of August, 2024

Katherine Kelly Vidal
*Director of the United States Patent and Trademark Office*